United States Patent
Chatterjee

(10) Patent No.: US 9,481,326 B2
(45) Date of Patent: Nov. 1, 2016

(54) ADAPTING VEHICLE SYSTEMS BASED ON WEARABLE DEVICES

(71) Applicant: Harman International Industries, Incorporated, Stamford, CT (US)

(72) Inventor: Dibyendu Chatterjee, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 73 days.

(21) Appl. No.: 14/073,691

(22) Filed: Nov. 6, 2013

(65) Prior Publication Data

US 2015/0127215 A1    May 7, 2015

(51) Int. Cl.
- *B60R 16/02* (2006.01)
- *B60H 1/00* (2006.01)
- *H04W 4/00* (2009.01)
- *H04W 4/04* (2009.01)

(52) U.S. Cl.
CPC ........... *B60R 16/02* (2013.01); *B60H 1/00642* (2013.01); *H04W 4/001* (2013.01); *H04W 4/006* (2013.01); *H04W 4/046* (2013.01)

(58) Field of Classification Search
CPC ... H04W 4/001; H04W 4/006; H04W 4/046; B60H 1/00642; B60R 16/02
See application file for complete search history.

(56) References Cited

U.S. PATENT DOCUMENTS

| | | | |
|---|---|---|---|
| 2003/0076968 A1 | 4/2003 | Rast | |
| 2008/0174451 A1 | 7/2008 | Harrington et al. | |
| 2009/0290718 A1* | 11/2009 | Kahn | H03G 3/32 381/57 |
| 2010/0005953 A1* | 1/2010 | Kemmochi | H03G 3/32 84/633 |
| 2012/0212353 A1 | 8/2012 | Fung et al. | |
| 2013/0226371 A1* | 8/2013 | Rovik | H04L 63/102 701/2 |

OTHER PUBLICATIONS

European Patent Office, Extended European Search Report Issued in European Patent Application No. 14191789.8, Mar. 18, 2015, Germany, 5 pages.

* cited by examiner

*Primary Examiner* — Yuen Wong
(74) *Attorney, Agent, or Firm* — Alleman Hall McCoy Russell & Tuttle LLP

(57) ABSTRACT

Embodiments are described for an in-vehicle computing system, and methods of controlling vehicle settings using the in-vehicle computing system based on input received from a wearable device. Input may also be received from a mobile device. The in-vehicle computing system may automatically adjust one or more vehicle settings based on the received input.

16 Claims, 8 Drawing Sheets

ADAPTING VEHICLE SYSTEMS BASED ON WEARABLE DEVICES

FIELD

The disclosure relates to an in-vehicle computing system and associated vehicle controls based on input from various mobile and wearable devices.

BACKGROUND

Vehicles may include an in-vehicle computing system, such as a head unit for an infotainment system, which may provide multimedia and control functions. For example, an in-vehicle computing system may provide navigational, multimedia playback, telecommunication, in-vehicle climate control, and/or other functions. The in-vehicle computing system may also be communicatively coupled to a mobile device of a user. The in-vehicle computing system may receive user input indicative of the user's preferences to control elements of the vehicle and in-vehicle computing system, thereby improving the user's in-vehicle experience.

Wearable devices have become increasingly popular. Such devices have one or more wearable sensors that generate signals regarding the user's environment, user's activity level, physical state (e.g., heart rate), location, cognitive load, etc. Often, user preferences that reflect desirable changes to the user's in-vehicle environment may be gleaned based on their interaction with their wearable device and/or mobile device.

SUMMARY

Embodiments are disclosed for in-vehicle computing systems and methods of controlling vehicle systems based on input from a wearable device. In example embodiments, input is received at an in-vehicle computing system from a wearable device of a user, and one or more vehicle settings are automatically adjusted based on the received input. The wearable device may be communicatively coupled to the in-vehicle computing system such that the input is directly received from the wearable device. Alternatively, the wearable device may be communicatively coupled to a mobile device, the mobile device communicatively coupled to the in-vehicle computing system, such that input from the wearable device is received indirectly via the mobile device.

In other example embodiments, an in-vehicle infotainment system may comprise a processor, an external device interface communicatively coupled to a mobile device, and a storage device. The storage device may store instructions executable by the processor to receive aggregated input regarding a physical condition and an environment of a user from the mobile device, the input regarding the physical condition of the user collected by a wearable device communicatively coupled to the mobile device. The storage device may store further instructions executable by the processor to automatically select settings for one or more components of the in-vehicle infotainment system based on the aggregated input, and transmit control instructions to the one or more components of the in-vehicle infotainment system based on the automatically selected settings.

In still other example embodiments, an in-vehicle system may include an audio system, a climate control system, and an in-vehicle computing system communicatively coupled to each of the audio system and the climate control system. The in-vehicle computing system may be configured with instructions to receive a first input from a wearable device worn by a vehicle operator and receive a second input from a mobile device of the vehicle operator. The first input received from the wearable device may be indicative of a physical parameter of the vehicle operator, for example. The second input received from the mobile device may be indicative of an environmental parameter of the vehicle operator, for example. The computing system may be further configured to automatically adjust settings of each of the climate control system and the audio system based on the first and second input. For example, cabin temperature settings may be automatically adjusted based on a pulse rate of the user while audio system sound levels are automatically adjusted based on an ambient noise level.

BRIEF DESCRIPTION OF THE DRAWINGS

The disclosure may be better understood from reading the following description of non-limiting embodiments, with reference to the attached drawings, wherein below.

DETAILED DESCRIPTION

In-vehicle computing systems have enabled vehicles to become an extension of a network of smart devices operated by a user. The smart devices are configured to collect information and then collaborate that information with other interconnected devices. The various smart devices may include sensors and components that provide information regarding various aspects of a user. For example, a wearable device worn by a user may include various sensors for providing data regarding physical aspects of the user (such the user's pulse rate) while the user's mobile device may provide data regarding environmental aspects of the user (such as ambient conditions in the user's environment). In addition, interactions of the user with the wearable device and the mobile device may provide information regarding cognitive aspects of the user (such as a cognitive load or stress level of the user). Using the data collected by such devices, an in-vehicle computing system may select vehicle settings (e.g., climate control setting, audio system settings, etc.) that would improve the vehicle ambience. In other words, the sensors of the various devices can be leveraged to adapt vehicle settings before a user enters the vehicle (or while the user is in the vehicle) to improve the user's in-vehicle experience.

Figure 1:
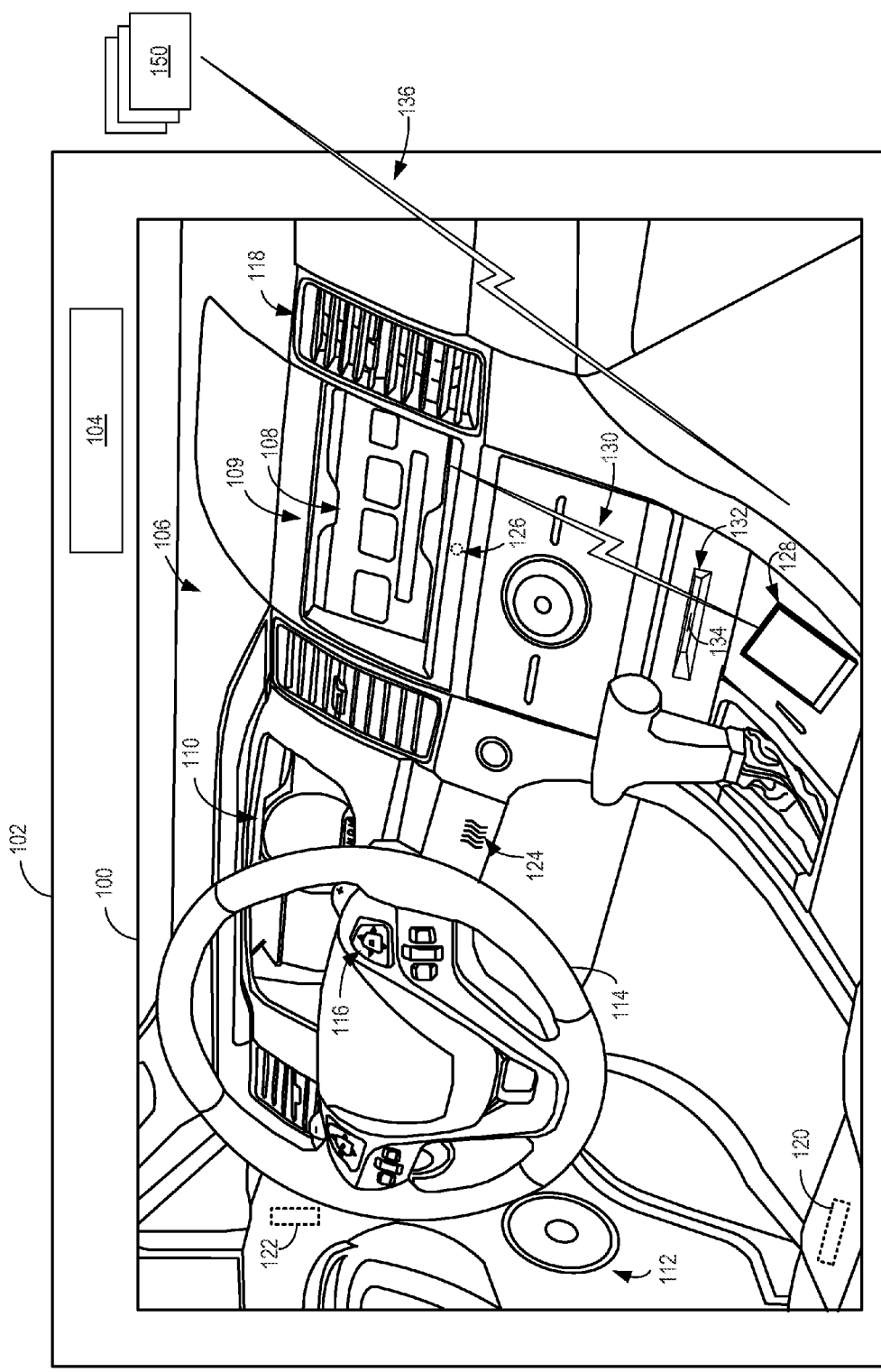
FIG. 1 is a partial view of a vehicle cabin including an in-vehicle computing system communicatively coupled to a mobile device and a wearable device, in accordance with one or more embodiments of the present disclosure.

FIG. 1 shows an example partial view of an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices, such as mobile device 128 and wearable device 150.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106.

Instrument cluster 110 may include various gauges such as a fuel gauge, tachometer, speedometer, and odometer, as well as indicators and warning lights. A steering wheel 114 may project from the instrument panel below instrument cluster 110. Optionally, steering wheel 114 may include controls 116 which may be used in conjunction with touch screen 108 to navigate features of an in-vehicle computing system and to control the in-vehicle computing system. In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate (such as cabin temperature) via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin. A microphone 126 may be included to receive user input in the form of voice commands, to enable a user to conduct telephone calls, and/or to measure ambient noise in the cabin 100. It is to be understood that the placement of the sensors illustrated in FIG. 1 is exemplary, and one or more additional or alternative sensors may be positioned in any suitable location of the vehicle. For example, additional sensors may be positioned in an engine compartment, on an external surface of the vehicle, and/or in other suitable locations for providing information regarding the operation of the vehicle, ambient conditions of the vehicle, a user of the vehicle, etc. As also elaborated with reference to FIGS. 2-3, information regarding ambient conditions of the vehicle, or vehicle driver may also be received from sensors external to the vehicle (that is, not part of the vehicle system), such as from sensors coupled to wearable device 150 or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

While the mobile device 128 is illustrated as being spatially separated from the in-vehicle computing system and connected via a substantially external communication link (e.g., a cable or radiofrequency signal), it is to be understood that a slot 132 or other storage structure may be formed in the instrument panel 106 or other location in the vehicle to hold the mobile device in a particular location. The storage structure may include an integrated connector 134 to which the mobile device 128 may be attached or "docked" for providing a substantially internal communication link between the mobile device and the computing system.

In-vehicle computing system 109 may also be communicatively coupled to additional devices operated by the user but located external to vehicle 102, such as one or more wearable devices 150. In the depicted embodiment, wearable device 150 is located outside of vehicle 102 though it will be appreciated that in alternate embodiments, wearable device may be located inside cabin 100. As elaborated at FIG. 2, the wearable device may include a portable electronic device, electronic wrist band, electronic head band, portable music player, electronic activity tracking device, pedometer, smart-watch, GPS system, etc. Wearable device 150 may be connected to the in-vehicle computing system via communication link 136 which may be wired or wireless, as discussed with reference to communication link 130, and configured to provide two-way communication between the wearable device and the in-vehicle computing system. For example, wearable device 150 may include one or more sensors and communication link 136 may transmit sensor output from wearable device 150 to in-vehicle computing system 109 and touch screen 108. Input received from wearable device 150 may be indicative of various aspects of the user's physical condition, surroundings, etc. In-vehicle computing system 109 may analyze the input received from wearable device 150, such as while the user is outside the vehicle, and assess the user's state (e.g., condition, potential preferences, etc.) and select settings for various in-vehicle systems (such as climate control system or audio system) based on the assessment.

In some embodiments, wearable device 150 may be communicatively coupled to in-vehicle computing system 109 indirectly, via mobile device 128. For example, communication link 136 may communicatively couple wearable device 150 to mobile device 128 such that sensor output from wearable device 150 is relayed to mobile device 128. Data received from wearable device 150 may then be aggregated at mobile device 128 with data collected by mobile device 128, the aggregated data then transmitted to in-vehicle computing system 109 and touch screen 108 via communication link 130.

Figure 2:
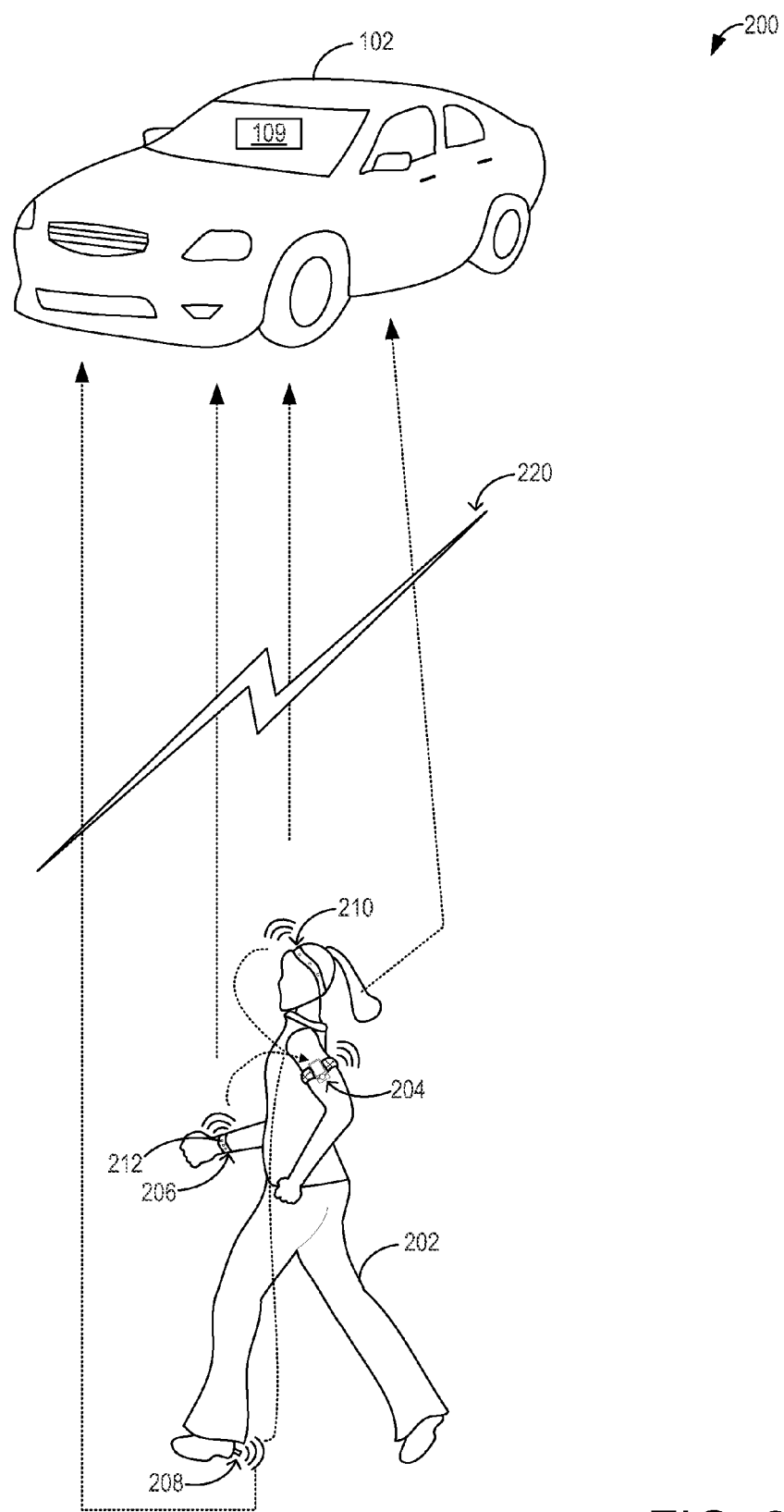
FIG. 2 is a view of an in-vehicle computing system receiving input from one or more wearable devices and mobile devices of a user, in accordance with one or more embodiments of the present disclosure.

FIG. 2 shows an example embodiment 200 of data regarding various aspects of a user (also referred to as "user data") captured by one or more mobile devices and wearable devices of a user and relay of the captured data to an in-vehicle computing system. In the depicted example, user data is captured while user 202 is outside of and away from vehicle 102, and then relayed to in-vehicle computing system 109. However, it will be appreciated that in alternate examples, user data may be collected and transmitted while the user is in vehicle 102.

User data is captured based on interactions of user 202 with mobile device 204 and wearable devices 206, 208, and 210. The user data is then relayed to in-vehicle computing system 109 via a communication link or network, such as communication link 130 and/or 136 of FIG. 1. The input received from mobile device 204 may then be processed at in-vehicle computing system 109 so as to assess and infer a user condition. Mobile device 204 may include a smart phone, a tablet, a laptop computer, a portable media player, and/or any suitable mobile computing device, such as mobile device 128 of FIG. 1. User data captured by mobile device 204 may include, as a non-limiting example, information indicative of a cognitive load of the user. For example, the cognitive load may be inferred by the in-vehicle computing system based on input regarding applications operated by the user on the mobile device, such as gaming applications or music applications, playlists listened to by the user on the mobile device, a genre of music selected in the playlist, a radio station selection, etc. Further still, the user's cognitive load may be inferred based on a frequency of calls received and answered on the mobile device, a duration of the calls, etc. For example, when input from the mobile device indicates that the user has frequently answered phone calls, most of which have been of a significantly large duration, it may be inferred that the user's stress level is likely to be elevated.

User data collected by mobile device 204 may further include information regarding an environment of the user. For example, if the user is outside the vehicle, mobile device 204 may collect data regarding a geographical location of the user, duration of time spent at the geographical location, ambient conditions such as ambient humidity, ambient temperature, altitude, weather conditions (current and expected), etc. The information about the user's environment may be collected by one or more sensors coupled to the mobile device or may be collected by the mobile device by communicating with local GPS systems via a network (e.g., via wireless communication with a local cellular phone tower). As such, the same and/or similar types of information may also be gathered by mobile device 204 while user 202 is inside vehicle 102.

User data gathered by mobile device 204 may be communicated to in-vehicle computing system 109 via communication link 220 which may be wired or wireless communication. For example, in-vehicle computing system 109 may directly receive input indicative of an environment of the user from mobile device 204 over the communication link. Input from the mobile device may be received at the in-vehicle computing system continuously, or intermittently, such as at predefined durations (e.g., every half hour, every hour, etc.). The predefined durations may be selected by the user, or may be default settings. Alternatively, input from the mobile device may be received at the in-vehicle computing system in response to predefined user events, such as every time the user changes a playlist on the mobile device, every time the user moves beyond a threshold distance of vehicle 102, every time the user initiates a specific application (e.g., a gaming application) on the mobile device, etc.

Further still, in some embodiments, in-vehicle computing system 109 may selectively request specified user input (such as input indicative of specific environmental aspects of the user) from mobile device 204 via communication link 220. In response to the request, one or more sensors, components, or applications of mobile device 204 may be operated or activated to collect the requested user data, the collected data then relayed back to in-vehicle computing system 109 via communication link 220. In one example, in-vehicle computing system 109 may transmit control instructions to mobile device 204 to sample an ambient noise level and/or an ambient noise genre in the environment of the user (also referred to as "sound sampling"). In response to the request for sound sampling, a microphone and/or recorder of the mobile device may be operated for a defined duration to record the ambient noise. In-vehicle computing system 109 may receive the recorded data from mobile device 204 and process the signals to identify an ambient noise level (e.g., is the user in a noisy location or a quiet location), noise source (e.g., is the noise due to vehicles, construction work, a concert, etc.), ambient music genre (e.g., is the user in an environment where classical music is being played or reggae music is being played, which band's music is being played), etc.

Wearable devices 206-210 may include devices worn by user 202. Example wearable devices may include an electronic activity tracking device configured as a wristband (as at 206), configured as a headband (as at 210) or any other appropriate format. Other example wearable devices includes a portable electronic device, portable music player, pedometer 208 (such as a pedometer coupled to the user's shoe, as shown), smart-watch, GPS system, etc. In the depicted example, user 202 is shown wearing wearable devices 206-210 while performing fitness or athletic activities such that user data regarding the physical condition and/or physical activity level of user 202 can be gathered by wearable devices 206-210. The one or more wearable sensors 212 may include, for example, a heart rate sensor, a pulse rate sensor, a blood pressure sensor, a blood sugar sensor, body temperature sensor, a perspiration sensor, accelerometer, gyroscope, etc. These sensors may collect data regarding various physical parameters or aspects of the user. In further embodiments, wearable devices 206-210 may also be configured to collect data regarding the user's environment. Sensor signals may then be transmitted by the respective wearable device to in-vehicle computing system 109. As such, user data may be gathered by wearable devices 206-210 as long as the device is worn by the user, irrespective of whether the user is inside or outside of vehicle 102.

User data gathered by wearable devices 206-210 may also be communicated to in-vehicle computing system 109 via communication link 220. For example, in-vehicle computing system 109 may directly receive input indicative of a physical activity level, a physical condition, and/or an environment of the user from wearable devices 206-210 over the communication link. Alternatively, the input may be received indirectly via the mobile device. For example, user data gathered by wearable devices 206-210 may first be transmitted to mobile device 204 (e.g., via communication link 220) where the data is aggregated and then relayed on to in-vehicle computing system 109 (via the same communication link 220). In such an embodiment, the mobile device may act as a "base unit" for all the sensors.

Input from the wearable devices may be received at the in-vehicle computing system continuously, or intermittently, such as at predefined durations selected by the user, or default duration settings. Alternatively, input from the wearable devices may be received at the in-vehicle computing system in response to predefined user events, such as every time the user operates the wearable device, changes a setting of the wearable device, initiates a specific application on the wearable device, etc.

Further still, in some embodiments, in-vehicle computing system 109 may specifically request input indicative of the physical condition or activity level from any one of wearable devices 206-210 via communication link 220. In response to the request, one or more sensors or components of wearable devices 206-210 may be operated or activated to collect the requested user data, the collected data then relayed back to in-vehicle computing system 109 via communication link 220. In one example, in-vehicle computing system 109 may transmit control instructions to the wearable device to sample a pulse rate and basal body temperature of the user. In response to the request, a pulse rate sensor and a temperature sensor of the wearable device may be operated for a defined duration. In-vehicle computing system 109 may receive the recorded data and process the signals to determine the activity level of the user (e.g., is the user running or walking, is the user feeling hot or cold, etc.).

Figure 4:
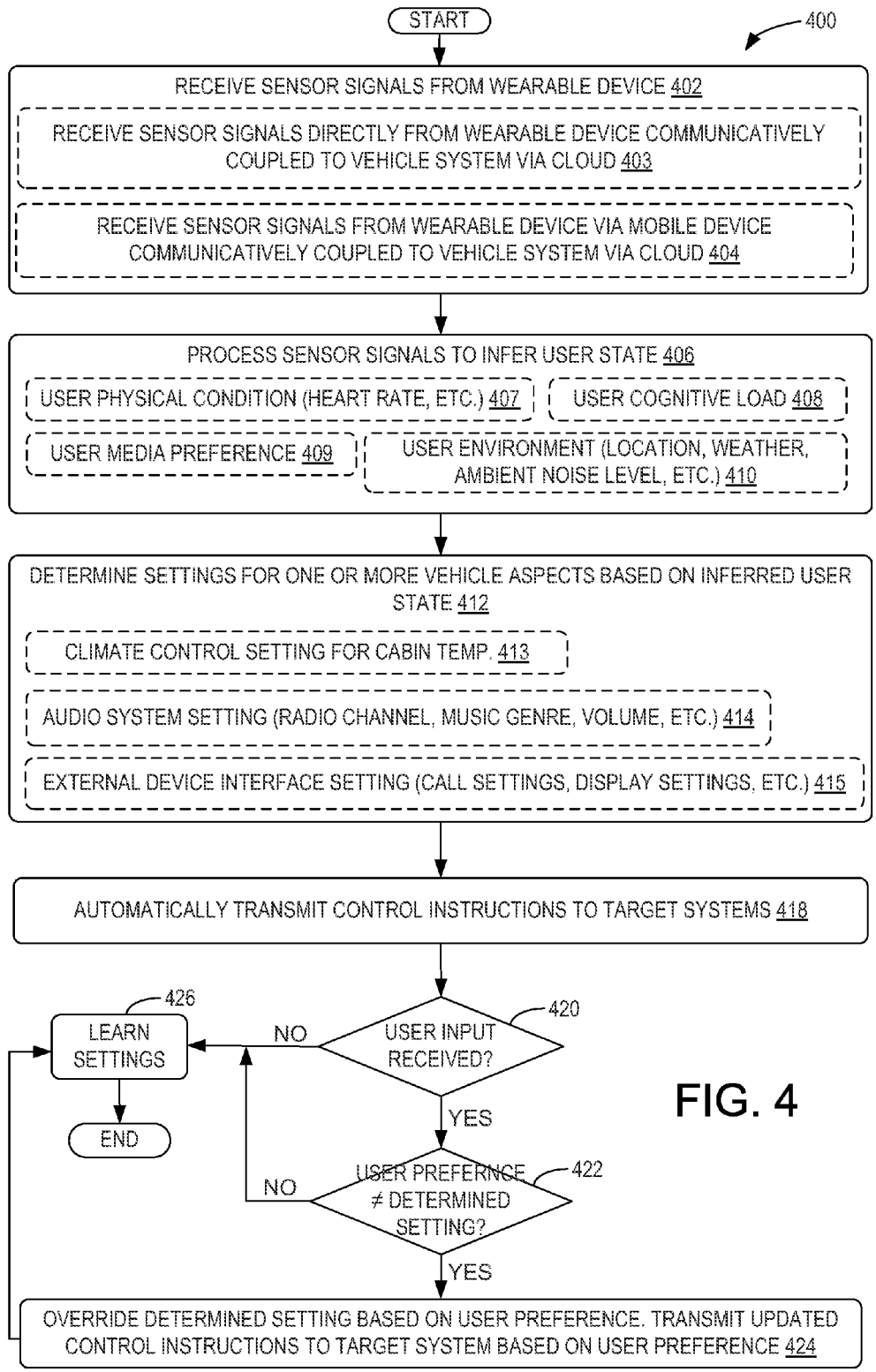
FIG. 4 is a flow chart of a method of automatically controlling one or more vehicle systems based on input received from a wearable device, in accordance with one or more embodiments of the present disclosure.
Figure 5:
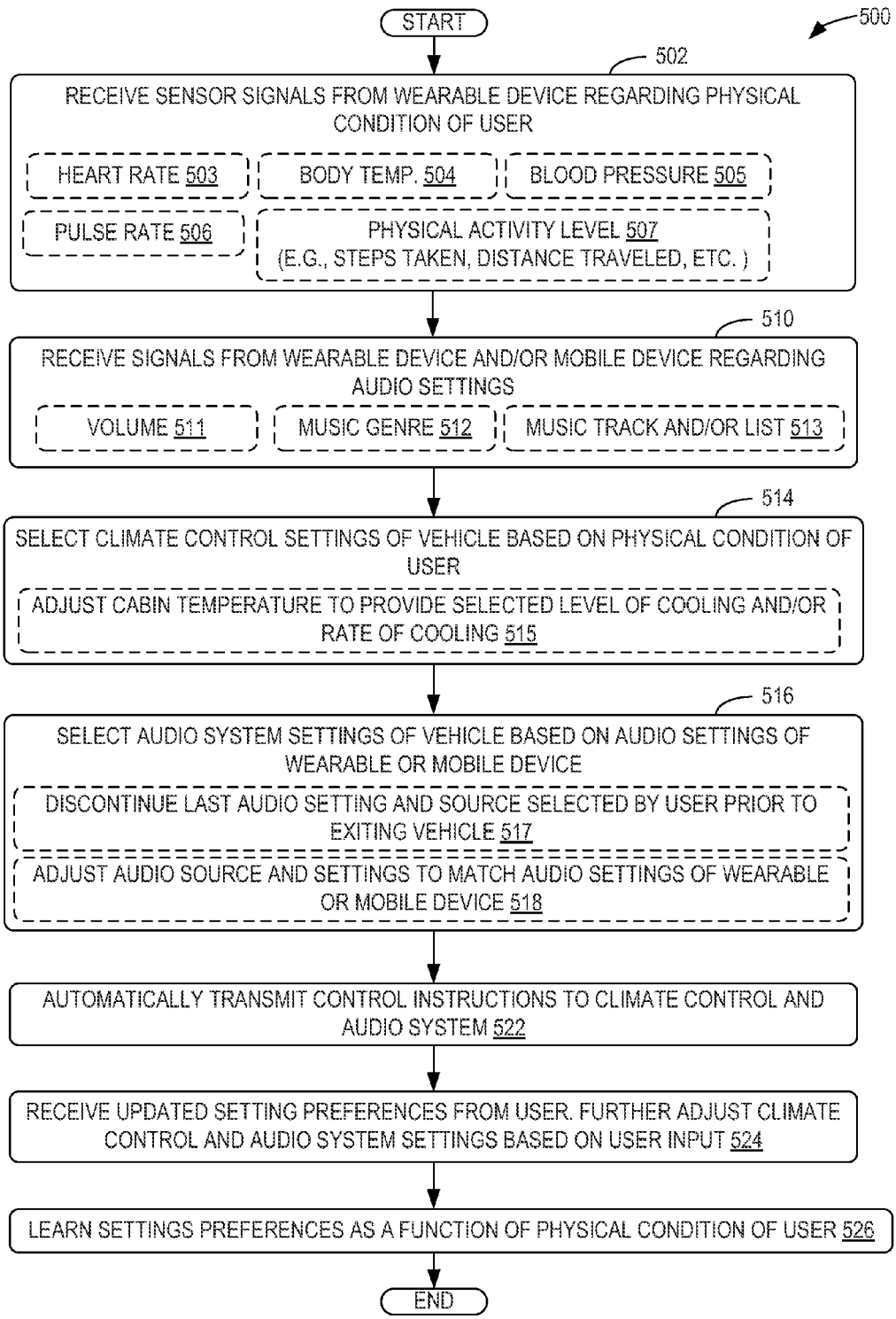
FIG. 5 is a flow chart of a method of automatically controlling settings of a climate control system and an audio system based on input from a wearable device regarding a physical condition of a user, in accordance with one or more embodiments of the present disclosure.
Figure 6:
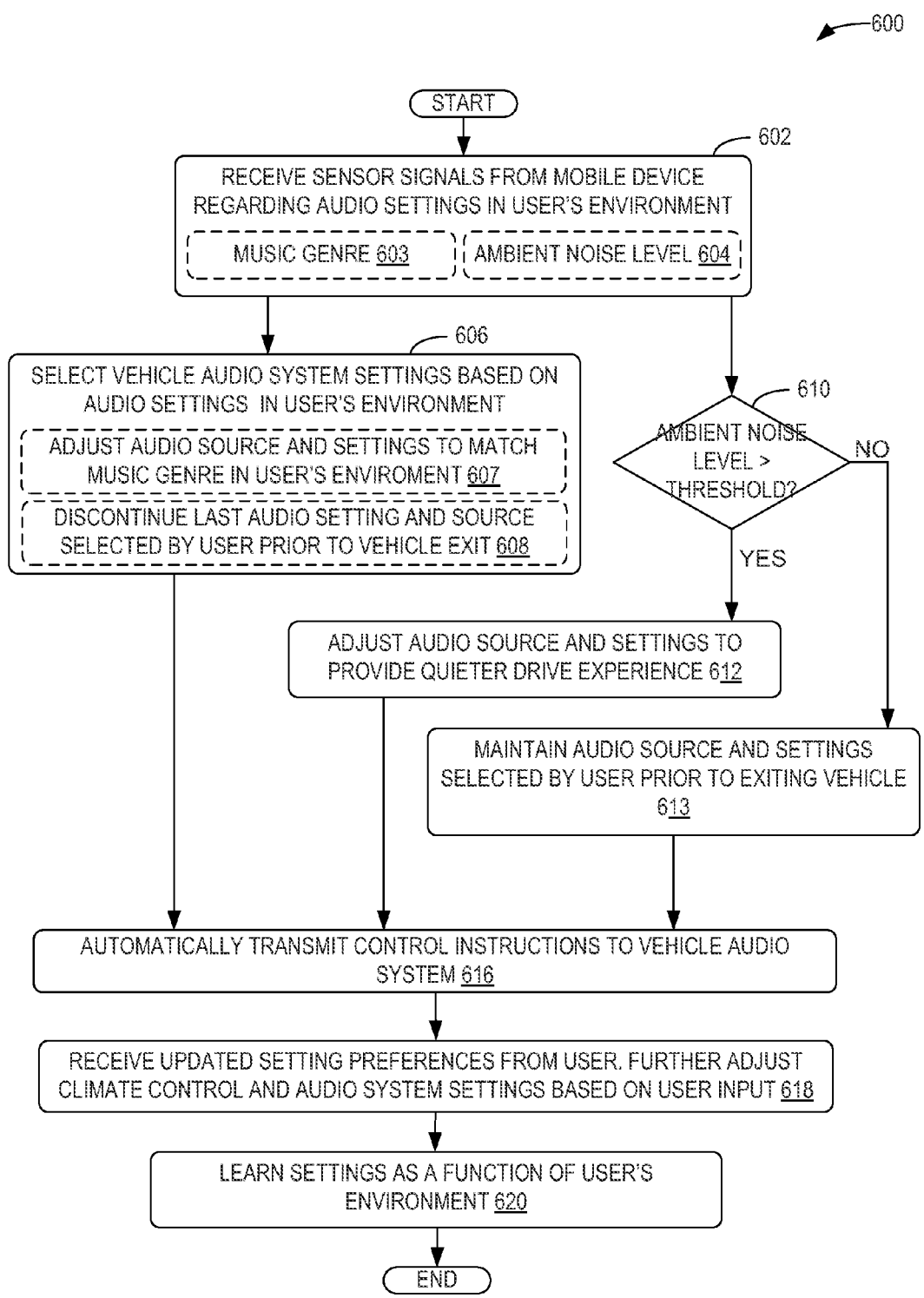
FIG. 6 is a flow chart of a method of automatically controlling settings of an audio system based on input from a mobile device regarding a user's environment, in accordance with one or more embodiments of the present disclosure.

As elaborated with reference to FIGS. 4-6, the in-vehicle control system may be configured to adjust one or more vehicle settings based on the input received from the mobile device and/or the wearable device. These may include settings for one or more vehicle systems such as a vehicle climate control system (e.g., air conditioner or heater settings), in-vehicle audio system (e.g., volume level and audio source settings), driver seat (e.g., recline angle of driver seat), etc. The settings may be automatically adjusted without requiring specific input from the vehicle operator, such as by selecting settings before the user returns inside the vehicle. That is, in-vehicle computing system 109 may infer settings that the user is likely to choose, or would prefer, based on an assessment of the input received from the wearable device and/or mobile device of the user, the target vehicle systems then controlled to provide those settings. Optionally, prompts may also be provided to the user via a user interface of the in-vehicle computing system to suggest or confirm settings that the user is likely to prefer based on the assessment of the input received from the wearable device and/or mobile device. In other words, the operator's preferences may be gleaned from the user's interaction with the mobile and wearable device and vehicle settings adjusted accordingly.

For example, in response to input from the devices indicating that the user is engaged in an elevated physical activity level (e.g., based on sensor signals indicating the user pulse rate is elevated and the user is perspiring), the in-vehicle control system may adjust the climate control system to increase cabin cooling so that cooled cabin air is provided to the user upon entering the vehicle. Additionally, a playlist may be automatically selected, such as the playlist the user was already listening to during the physical activity, and played on the vehicle's audio system.

Figure 3:
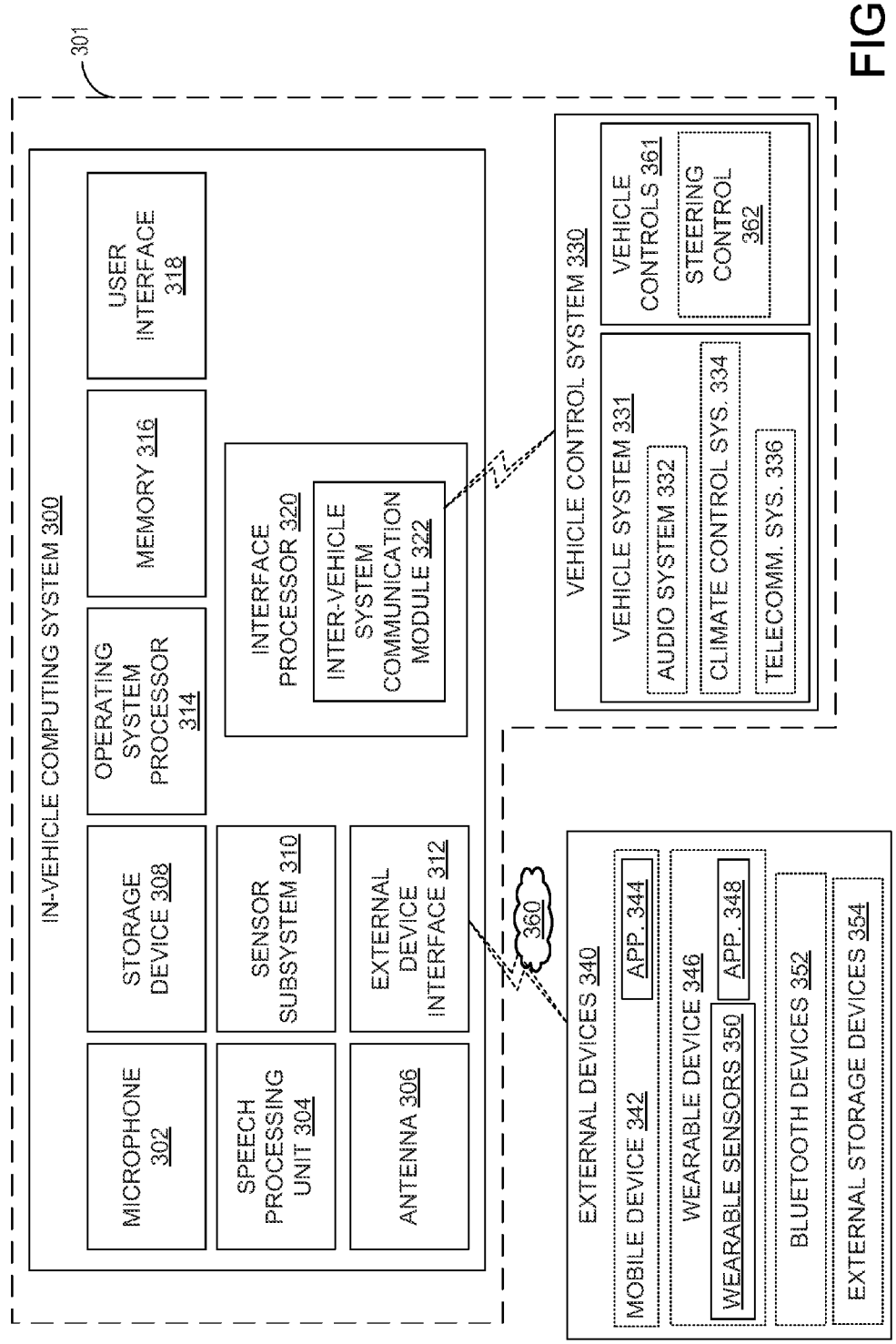
FIG. 3 shows a block diagram of an in-vehicle computing system in accordance with one or more embodiments of the present disclosure.

FIG. 3 shows a block diagram of an in-vehicle computing system 300 configured and/or integrated inside vehicle 301. In-vehicle computing system 300 may be an example of in-vehicle computing system 109 of FIGS. 1 and 2 in some embodiments. In one example, the in-vehicle computing system is a vehicle infotainment system configured to provide information-based media content (audio and/or visual media content, including entertainment content) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 301 in order to enhance a driver and/or passenger's in-vehicle experience.

In-vehicle computing system 300 may include one or more processors including an operating system processor 314 and an interface processor 320. Operating system processor 314 may execute an operating system on the in-vehicle computing system, and control input/output, display, playback, and other operations of the in-vehicle computing system. Interface processor 320 may interface with a vehicle control system 330 via an inter-vehicle system communication module 322.

Inter-vehicle system communication module 322 may output data to other vehicle systems 331 and vehicle control elements 361, while also receiving data input from other vehicle components and systems 331, 361, e.g. by way of vehicle control system 330. When outputting data, inter-vehicle system communication module 322 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 308 may be included in in-vehicle computing system 300 to store data such as instructions executable by processors 314 and 320 in non-volatile form. The storage device 308 may store application data to enable the in-vehicle computing system 300 to run an application for connecting to and/or pairing with a mobile device and/or a wearable device. The application may then retrieve user information gathered by the mobile device and the wearable device. In-vehicle computing system 300 may further include a volatile memory 316. Volatile memory 316 may be random access memory (RAM). Non-transitory storage devices, such as non-volatile storage device 308 and/or volatile memory 316, may store instructions and/or code that, when executed by a processor (e.g., operating system processor 314 and/or interface processor 320), controls the in-vehicle computing system 300 to perform one or more of the actions described in the disclosure.

A microphone 302 may be included in the in-vehicle computing system 300 to receive voice commands from a user and/or to measure ambient noise in the vehicle, and a speech processing unit 304 may process the received voice commands. In some embodiments, in-vehicle computing system 300 may also be able to receive voice commands and sample ambient vehicle noise using a microphone included in an audio system 332 of the vehicle.

One or more additional sensors may be included in a sensor subsystem 310 of the in-vehicle computing system 300. For example, the sensor subsystem 310 may include a camera, such as a rear view camera for assisting a user in parking the vehicle. Sensor subsystem 310 of in-vehicle computing system 300 may communicate with and receive inputs from various vehicle sensors and may further receive user inputs. For example, the inputs received by sensor subsystem 310 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 310 alone, other sensors may communicate with both sensor subsystem 310 and vehicle control system 330, or may communicate with sensor subsystem 310 indirectly via vehicle control system 330.

External device interface 312 of in-vehicle computing system 300 may communicate with one or more external devices 340 located external to vehicle 301. While the external devices are illustrated as being located external to vehicle 301, it is to be understood that they may be temporarily housed in vehicle 301, such as when the user is operating the external devices while operating vehicle 301. In other words, the external devices 340 are not integral to vehicle 301. The external devices 340 may include a mobile device 342 (e.g., connected via a Bluetooth connection) or an alternate Bluetooth-enabled device 352. Mobile device 342 may be a mobile phone, smart phone, or other portable electronic device. Other external devices include a wearable device 346 having one or more wearable sensors 350, such as wearable devices 206-210 of FIG. 2. Still other external devices include external storage devices 354, such as solid-state drives, pen drives, USB drives, etc. External devices 340 may communicate with in-vehicle computing system 300 either wirelessly or via connectors without departing from the scope of this disclosure. For example, external devices 340 may communicate with in-vehicle computing system 300 through the external device interface 312 over network 360, a universal serial bus (USB) connection, a direct wired connection, a direct wireless connection, and/or other communication link.

One or more applications 344 may be operable on mobile device 342. As an example, mobile device application 344 may be operated to aggregate user data regarding interactions of the user with the mobile device. For example, mobile device application 344 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 344 to external device interface 312 over network 360. In addition, specific user data requests may be received at mobile device 342 from in-vehicle computing system 300 via the external device interface 312. The specific data requests may include requests for determining where the user is geographically located, an ambient noise level and/or music genre at the user's location, an ambient weather condition (temperature, humidity, etc.) at the user's location, etc. Mobile device application 344 may send control instructions to components (e.g., microphone, etc.) or other applications (e.g., navigational applications) of mobile device 342 to enable the requested data to be collected on the mobile device. Mobile device application 344 may then relay the collected information back to in-vehicle computing system 300.

Likewise, one or more applications 348 may be operable on wearable device 346. As an example, wearable device application 348 may be operated to aggregate user data regarding interactions of a user with the wearable device. For example, wearable device application 348 may aggregate data regarding a distance walked or run by the user, the user's heart rate, pulse rate, perspiration level, basal body temperature, etc. The collected data may be transferred by wearable device application 348 to external device interface 312 over network 360. Alternatively, the collected data may be transferred by wearable device application 348 to mobile device 342, and mobile device application 348 may aggregate data collected by each of the mobile device and the wearable device and transmit the aggregated data to in-vehicle computing system 300 over network 360. An example method of data aggregation by an application of the mobile device and transmission of aggregated data to an in-vehicle computing system is discussed with reference to FIG. 7.

Vehicle control system 330 may include controls for controlling aspects of various vehicle systems 331 involved in different in-vehicle functions. These may include, for example, controlling aspects of vehicle audio system 332 for providing audio entertainment to the vehicle occupants, aspects of climate control system 334 for meeting the cabin cooling or heating needs of the vehicle occupants, as well as aspects of telecommunication system 336 for enabling vehicle occupants to establish telecommunication linkage with others.

Audio system 332 may include one or more acoustic reproduction devices including electromagnetic transducers such as speakers. Vehicle audio system 332 may be passive or active such as by including a power amplifier. In some examples, in-vehicle computing system 300 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 334 may be configured to provide a comfortable environment within the cabin or passenger compartment of vehicle 301. Climate control system 334 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 330 may also include controls for adjusting the settings of various vehicle controls 362 (or vehicle system control elements) related to the engine and/or auxiliary elements within a cabin of the vehicle, such as steering wheel controls 362 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. The control signals may also control audio output at one or more speakers of the vehicle's audio system 332. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 334. For example, the control signals may increase delivery of cooled air to a specific section of the cabin.

Control elements positioned on an outside of a vehicle (e.g., controls for a security system) may also be connected to computing system 300, such as via communication module 322. The control elements of the vehicle control system may be physically and permanently positioned on and/or in the vehicle for receiving user input.

In addition to receiving control instructions from in-vehicle computing system 300, vehicle control system 330 may also receive input from one or more external devices 340 operated by the user, such as from wearable device 346 and mobile device 342. This allows aspects of vehicle systems 331 and vehicle controls 361 to be controlled based on user input received from the external devices 340.

In-vehicle computing system 300 may further include an antenna 306. Antenna 306 is shown as a single antenna, but may comprise one or more antennas in some embodiments. The in-vehicle computing system may obtain broadband wireless internet access via antenna 306, and may further receive broadcast signals such as radio, television, weather, traffic, and the like. The in-vehicle computing system may receive positioning signals such as GPS signals via one or more antennas 306. The in-vehicle computing system may also receive wireless commands via RF such as via antenna(s) 306 or via infrared or other means through appropriate receiving devices. In some embodiments, antenna 306 may be included as part of audio system 332 or telecommunication system 336. Additionally, antenna 306 may provide AM/FM radio signals to external devices 340 (such as to mobile device 342) via external device interface 312.

One or more elements of the in-vehicle computing system 300 may be controlled by a user via user interface 318. User interface 318 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 300 and mobile device 342 via user interface 318. In addition to receiving a user's vehicle setting preferences on user interface 318, vehicle settings selected by in-vehicle control system may be displayed to a user on user interface 318. As elaborated at FIG. 4, based on input from one or more external devices, such as from mobile device 342 and wearable device 346, in-vehicle computing system 300 may infer a user state (e.g., physical state, cognitive state, etc.) and automatically determine vehicle settings based on the user state, the settings selected to improve the in-vehicle ambience and drive feel for the user. The determined settings may be displayed to the user on a display of the user interface. Additionally, confirmation regarding the selected settings may be sought from the user via the user interface.

FIG. 4 is a flow chart of a method 400 of operating an in-vehicle computing system to control one or more vehicle systems based on user input received from a mobile device and/or a wearable device. For example, method 400 may be performed by in-vehicle computing system 300 of FIG. 3 based on input from wearable devices 206-210 and mobile device 204 of FIG. 2.

Method 400 includes, at 402, receiving input from a wearable device. Specifically, input may be received at the in-vehicle computing system from one or more wearable devices. The wearable devices may be worn by a user and may include one or more wearable sensors such as a heart rate sensor, a temperature sensor, a perspiration level sensor, a pedometer, etc. Receiving input from the wearable device includes receiving sensor signals from the various wearable sensors of the wearable device based on interaction of the user with the wearable device. In one example, at 403, where the wearable device is communicatively coupled to the in-vehicle computing system via a communication link or network, receiving input from the wearable device includes directly receiving input from the wearable device. In another example, at 404, where the wearable device is communicatively coupled to a mobile device (e.g., via a communication link or network) and the mobile device, in turn, is communicatively to the in-vehicle computing system via a communication link or network, receiving input from the wearable device includes indirectly receiving input from the wearable device via the mobile device.

At 406, the method includes processing the sensor signals at the in-vehicle computing system to infer a user state. The input received from the wearable device may be indicative of various aspects of the user's state including, but not limited to, a physical condition 407 of the user, a cognitive load 408 of the user, a physical activity level of the user, a media preference 409 of the user, and the user's environment 410. Input regarding the physical condition of the user may include, for example, input regarding a heart rate or pulse rate of the user (from a heart rate or pulse rate sensor of the wearable device), a sweat level of the user (from a perspiration level sensor), a body temperature (from a temperature sensor), etc. A physical activity level of the user may include input as to whether the user is running, jogging, walking, or sprinting (such as from a pedometer). Input regarding the user cognitive load may include input indicative of a stress level of the user (e.g., based on a combination of outputs from a heart rate sensor, a blood pressure sensor, a blood sugar sensor, etc.). Input regarding the user environment may include input regarding the user's geographic location, the current and expected weather at the location, ambient temperature and humidity conditions, ambient noise level, etc.

At 412, the method includes, automatically determining one or more vehicle aspects or vehicle settings based on the inferred user state before receiving input from the user. That is, the vehicle settings are automatically selected before a user provides input, such as by pushing a button or dial of the vehicle's instrument panel, or by interacting with a touch screen of the vehicle. Likewise, vehicle settings are automatically selected before receiving input from the user via the wearable device or mobile device, such as by the user giving a voice command on the device. Specifically, one or more vehicle settings may be automatically selected based on the input received from the wearable device without receiving input regarding the settings from the user. The vehicle settings adjusted may include, for example, a climate control system setting (such as to adjust a cabin temperature at 413), an audio system setting (such as to adjust an audio output volume, a radio channel selection, or a music genre of the audio output at 415), an external device interface setting (such as to adjust settings for incoming or outgoing phone calls routed from a mobile device of the user to a user interface of the vehicle), seat settings (e.g., angle of recline for user's seat), etc.

At 418, the method includes automatically transmitting control instructions from the in-vehicle computing system to one or more vehicle systems to apply the selected settings to the target vehicle systems. For example, if the input from the wearable device is indicative of a high physical activity level of the user, the in-vehicle computing system may infer that the user is likely to desire air-conditioning. Thus, without requiring input from the user, the in-vehicle computing system may automatically adjust the cabin climate control settings to increase cabin cooling, or increase flow of cooled air to the user's section of the cabin. Accordingly, settings for the air vents, and an air conditioner may be determined and transmitted to the climate control system.

In this way, at 412-418, the in-vehicle computing system automatically adjusts settings the vehicle settings by receiving sensed information from a wearable device and/or a mobile device and by using the sensed information before receiving some any sort of user command from the user. This includes before receiving a command from the user at the in-vehicle computing system, such as via the user pushing a button, or touch screen, etc., as well as before receiving a command from the user at the in-vehicle computing system via the wearable device or the mobile device, such as via the user pressing a button of the mobile device, providing a voice command from the mobile device to the in-vehicle computing system, etc.

While the method of FIG. 4 shows settings being determined based on user input received from a wearable device, it will be appreciated that additional user input may also be received from a mobile device. For example, additional input regarding various aspects of the user (such as the physical state of the user and/or input indicative of an environment of the user) may be received at the in-vehicle computing system from the mobile device via a communication link or network. As an example, the input received from the mobile device may be indicative of environmental parameters of the user such as an ambient temperature, an ambient humidity level, an ambient noise level, an ambient audio setting, etc. The in-vehicle control system may determine additional settings, or further adjust the determined settings, of the one or more target vehicle systems based on the input received from the mobile device. Control instructions pertaining to the adjusted settings may then be delivered to the target vehicle systems or components.

At 420, the method determines if input has been received from the user. For example, the in-vehicle computing system may selectively receive user input from the user via a user interface of the in-vehicle computing system, such as from a touch screen and/or one or more control elements (such as steering wheel controls, instrument panel controls, microphone, etc.) of the vehicle. If no user input is explicitly received, then at 426, the method includes learning the settings adjusted based on the input received from the wearable device and/or mobile device, as a function of the user state. For example, based on the input, the settings may be learned as a function of the physical condition of the user, the cognitive load of the user, the environment of the user, etc. As an example, the in-vehicle control system may learn an amount of cabin cooling and/or rate of cabin cooling to apply when a user returns to the vehicle following a physical activity.

If user input is received, then at 422, the method includes comparing the received user input with the settings selected based on input from the wearable and/or mobile device. As such, the user input is indicative of settings specifically requested by the user. In comparison, the settings selected by the in-vehicle computing system are based on a user state inferred or estimated based on input regarding user interactions with one or more devices, as well as known user preferences previously input by a user. While the input from the mobile and/or wearable device can be processed to best guess or estimate vehicle settings the user is likely to select, the actual user selections may still vary. Therefore, at 422, it may be determined if the user requested vehicle settings are distinct from the settings automatically selected by the in-vehicle computing system. If there are no substantial differences, then the method returns to 426 to learn the settings as a function of the user state.

If there are differences, then at 424, the method includes adjusting one or more target vehicle system settings based on the received user input. Specifically, the one or more vehicle settings that were automatically adjusted based on input from the wearable and/or mobile device may be overridden with the vehicle system settings selected based on the user input. The in-vehicle control system may then transmit control instructions based on the input received from the user to the relevant target systems to adjust the system settings. The method may then proceed to 426 to learn the settings as a function of the user state. Specific examples are provided with reference to the methods of FIGS. 5-6.

In this way, the in-vehicle computing system allows vehicle settings to be adapted according to the immediate needs of the user, the immediate needs inferred based on input from a user's mobile device and/or wearable device. By assessing the input from the mobile device and wearable device to infer a user state, and adjusting vehicle settings based on the user state even before the user gets into the vehicle, the overall in-vehicle ambience and experience of the user is enhanced.

At FIG. 5, an example method 500 is shown for operating an in-vehicle computing system to control one or more vehicle systems based on input indicative of a physical condition of a user, the input received from a mobile device and/or a wearable device of the user.

At 502, the method includes receiving, at the in-vehicle computing system, input (e.g., a first input) from a wearable device, the input indicative of a physical parameter of the vehicle operator, such as a physical condition of the user. The physical parameter may be estimated by one or more wearable sensors of the wearable device. The physical parameters indicated by the first input may include heart rate 503, body temperature 504, blood pressure 505, pulse rate 506, physical activity level 507 (e.g., a number of steps taken, a distance traveled, etc.), perspiration level, blood oxygen level, blood sugar level, etc. For example, it may be determined if the vehicle operator is walking or jogging, if the operator has just run a race, if the operator has just completed his daily walk at the local park, etc.

At 510, the method includes receiving, at the in-vehicle computing system, input (e.g., a second input) from a mobile device of the operator (and/or the same wearable device or an alternate wearable device) indicative of an environmental parameter of the vehicle operator. For example, input regarding an ambient audio settings or environmental acoustic setting may be received via a microphone or music application of the mobile device. The environmental (audio) parameters may include, for example, a volume 511, a music genre 512, and a music track or list 513. For example, it may be determined if the user was in an area where there was loud music, if the user was listening to a particular playlist (e.g., listening to a favorite playlist while running), etc.

At 514, the method includes automatically determining climate control settings of the vehicle based on a physical condition of the user inferred from the first input received from the wearable device. This includes, at 515, selecting air conditioner, heater, and vent settings to adjust a cabin temperature so as to provide a selected level of cooling and/or rate of cooling. For example, if the first input is indicative of the user running or jogging, it may be anticipated that the user would like the cabin to be cool upon returning to the vehicle. The in-vehicle computing system may determine a cabin temperature setting the user is likely to request based on user climate control settings previously used (user settings history) and/or user climate control preferences learned during previous vehicle operation. Further, a cooler temperature setting may be determined if the input from the wearable device indicates the user was running than if the input indicates that the user was walking. Accordingly, air conditioner settings may be selected to provide the determined temperature setting to a determined section of the cabin (e.g., entire cabin or driver area). In an alternate example, the in-vehicle control system may select a default "cool" setting in response to the elevated physical activity level of the user, while overriding the climate control settings last selected by the vehicle operator (such as before exiting the vehicle).

It will be appreciated that in addition to climate control settings, various other vehicle settings may be selected based on the first input received from the wearable device. For example, if the first input is indicative of the user performing elevated physical activity, the in-vehicle computing system may select seat settings where the recline of the driver seat is increased to allow for increased relaxation of the driver upon entry into the vehicle. As another example, if the first input indicates that the user fell down (e.g., based on an acceleration sensor of the wearable device), the in-vehicle control system may automatically operate a telecommunication application and call for the appropriate assistance.

In addition to automatically selecting a setting, the in-vehicle control system may also display potential setting options to the user on a user interface, and allow the user to make a final selection before transmitting control instructions in accordance.

At 516, the method includes automatically determining audio system settings of the vehicle based on the environmental parameters of the user inferred from the second input received from the mobile device and/or wearable device. This includes, at 517, discontinuing or disabling a most recent or last audio setting and audio source selected by the user (e.g., selected by the user before exiting the vehicle). Further, at 518, a revised audio source or setting may be selected that is based on the environmental audio setting of the user, for example to match the audio setting of the wearable device. As an example, in response to the ambient noise level in the user's environment being higher than a threshold level, an audio system speaker volume may be increased to mask the ambient noise. This allows the user's in-vehicle experience to be improved when driving through a noisy area. As another example, a playlist currently running on the mobile device (e.g., a playlist the user was listening to while performing the physical activity) may be selected for playing on the vehicle's audio system upon reentry of the user into the vehicle. This would allow the user to continue listening to the same music even upon entering the vehicle. As still another example, a music genre of the playlist being listened to by the user may be sampled and audio settings for the vehicle's audio system may be selected so as to provide the same genre of music. In other words, a playlist of the vehicle's audio system may be changed from a last played playlist to a playlist that matches the current music genre experienced by the user on the mobile device or wearable device.

At 522, the method includes automatically transmitting control instructions from the in-vehicle control system to the target vehicle systems, such as the climate control system and the audio system, to operate them at the selected settings. As such, the settings are selected and the related control instructions are transmitted without receiving any specific input from the user, such as via a user interface of the vehicle. At 524, updated setting preferences, if any, may be received at the in-vehicle control system from the user. As such, these may be specific and explicit user setting preferences received from the user. If any specific user settings are received, updated control instructions may be transmitted to the target vehicle systems to further adjust the settings based on the received user input. At 526, the settings determined at 522 and 524 may be learned (e.g., stored in a memory of the computing system) as a function of the physical and environmental parameters determined by the sensors. For example, climate control settings may be learned as a function of the user's physical activity level, as determined based on the input from the wearable device.

It will be appreciated that while the method of FIG. 5 describes examples where vehicle system settings are selected based on input received from a wearable device or mobile device of the user while the user is outside the vehicle, the vehicle system settings adjusted immediately before or as soon as the user enters the vehicle, in alternate embodiments, the adjustments may be performed while the user is in the vehicle. The user may have the wearable device on and/or may be operating an application on the mobile device while in the vehicle. Based on input received from the devices within the vehicle, the in-vehicle computing system may determine settings and transmit control instructions to target systems within the vehicle. For example, in response to input from the wearable device indicative of increased perspiration level and/or increased body temperature of the user, the in-vehicle computing system may automatically reduce the cabin temperature setting and operate an air conditioner to direct more cooled air towards the user. As another example, elaborated at FIG. 8, if multiple phone calls or text messages are received on the user's smart phone while the user is driving the vehicle, the in-vehicle control system may prompt the user to determine if the user wants to answer any further calls or texts while driving. If not, the mobile device may be shifted to a low power mode so as not to disturb the user, and/or all calls received on the mobile device may be automatically redirected to a voice mail system. Alternatively, if the user wishes to continue answering the calls, the in-vehicle control system may automatically redirect the calls and other data from the mobile device to a user interface and/or external device interface of the vehicle so that the calls can be answered without requiring the user to operate the mobile device while driving.

Now turning to FIG. 6, an example method 600 is shown for operating an in-vehicle computing system to control one or more vehicle systems based on input indicative of a user's environment, the input received from a mobile device of the user.

At 602, the method includes receiving, at the in-vehicle computing system, input from a mobile device and/or a wearable device indicative of audio settings in the user's environment. For example, input indicative of a music genre 603 being played in the vicinity of the user, as well as ambient noise level 604 may be received. For example, it may be determined if the user was in an area where there was loud music (e.g., at a concert or a night club), if the user was listening to a particular genre of music (e.g., listening to rock music at the concert or listening to techno music at the night club), and if the user was listening to a particular playlist (e.g., listening to a favorite playlist on the device, attending a concert of a particular band).

Input regarding the ambient audio settings may be received from the mobile device automatically, or upon prompting. For example, the in-vehicle control system may send a request for sound sampling to the mobile device including instructions for operating a microphone and/or recorder of the mobile device. The ambient sounds may be recorded by the microphone and/or recorder and transmitted back to the in-vehicle computing system where they may be processed to identify genre, specific song identity, volume level, etc.

At 606, the method includes automatically determining audio system settings of the vehicle based on the audio settings of the user's environment inferred from the input received from the mobile device (and/or wearable device). This includes, at 607, adjusting an audio source and vehicle audio system settings to match the audio setting (e.g., music genre) of the user's environment. This further includes, at 608, discontinuing or disabling the last audio setting of the vehicle audio system selected by the user (such as before exiting the vehicle).

As an example, in response to ambient audio setting input received from the mobile device indicating that the user was at a rock concert, audio settings for the audio system in the vehicle may be selected so as to provide the same genre of music (e.g., by changing the audio source from an MP3 player to a rock-centric radio station, by selecting a rock playlist or by selecting a playlist corresponding to the same rock band). In other words, a playlist of the vehicle's audio system may be changed from a last played playlist to a playlist that matches the ambient music genre.

In parallel to 606, at 610, the method includes sampling the ambient noise level to determine if it is higher than a threshold level. This allows the in-vehicle computing system to determine if the user is in a noisy location. If the ambient noise level is elevated (e.g., higher than the threshold level), then at 612 the method adjusts the audio source and audio system settings to provide a quieter drive experience. For example, if the input indicates that the vehicle is in a noisy location, audio settings may be adjusted to mask the ambient noise and reduce user stress and dissatisfaction. Additionally, playlist suggestions may be provided to the user on the user interface, or automatically selected. For example, if the ambient noise level is elevated due to the vehicle being in the midst of traffic, the user's drive experience can be enhanced by automatically playing soothing and calm music, or a music genre or playlist that is marked as a user favorite. If the ambient noise level is not elevated, at 613 the method may include maintaining the audio source and audio system settings selected by the user prior to exiting the vehicle. Here the vehicle audio settings experienced by the user upon entering the vehicle may be the same as those experienced by the user before leaving the vehicle.

At 616, the method includes automatically transmitting control instructions from the in-vehicle control system to the target vehicle systems, such as the vehicle audio system, to operate the system at the determined settings. As such, the settings are selected and the related control instructions are transmitted without receiving any specific input from the user, such as via a user interface of the vehicle. At 618, updated setting preferences, if any, may be received at the in-vehicle control system from the user. As such, these may be specific and explicit user setting preferences received from the user. If any specific user settings are received, updated control instructions may be transmitted to the target vehicle systems to further adjust the settings based on the received user input. At 620, the settings determined at 616 and 618 may be learned (e.g., stored in a memory of the computing system) as a function of the user's environment. For example, audio system settings may be learned as a function of the user's ambient noise level and noise genre, as determined based on the input from the mobile device.

It will be appreciated that in any of methods 500-700, combined and cross-referenced input from both the wearable device and the mobile device may also be monitored over a duration and used to learn vehicle system settings and user's preferences and motives. For example, the in-vehicle control system may analyze sensor data from the mobile device and/or the wearable device over a duration (e.g., day, week, month, etc.) to determine if the user's physical activity level has increased, duration of physical activity has increased, location of physical activity has changed or remained constant, etc. If the input indicates that the user's duration of running is constantly increasing, and that the user has a preferred location for running, the location may be stored in the controller's memory as a navigational destination. The user may then route the vehicle to the stored location by prompting "let's go jogging". If the user also has a frequently used playlist that the user listens to during the jogging, the playlist may be stored in the memory with the navigational destination so that the playlist can be automatically played while the vehicle is driven to the jogging location.

Figure 7:
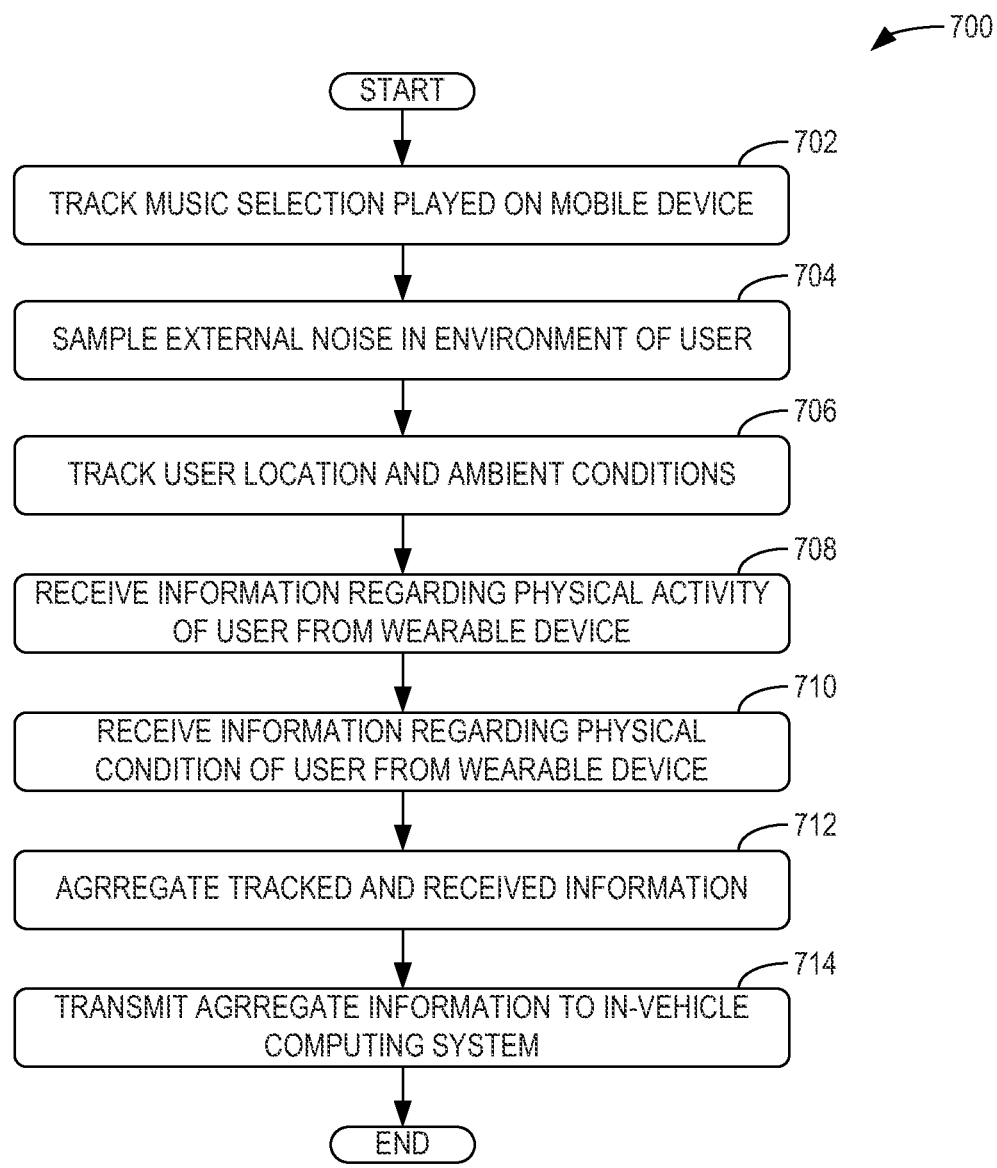
FIG. 7 is a flow chart of a method of aggregating user information collected by a wearable device and a mobile device, and transmitting the aggregated information to an in-vehicle computing system for controlling various vehicle system settings, in accordance with one or more embodiments of the present disclosure.

Now turning to FIG. 7, an example method 700 is shown for aggregating data, collected by a mobile device and a wearable device. The data may be collectively received at a mobile device and aggregated by an application running on the mobile device, such as mobile device application 344 running on mobile device 342 of FIG. 3. The aggregated data may then be transmitted to an in-vehicle control system communicatively coupled to the mobile device so that one or more vehicle settings can be adjusted to improve an in-vehicle ambience experienced by a user.

At 702, the method includes tracking audio settings including a music selection on mobile device. The tracking may be performed by an application running on the mobile device and may include storing information regarding, for example, music on a selected playlist, music details (genre, duration, etc.), volume settings, etc. At 704, the method includes sampling external noise in the environment of the user. For example, the application may operate a microphone and/or recorder of the mobile device to record ambient sounds for a duration. At 706, the application may track the user's location and ambient conditions. For example, the application may communicate with a navigational application of the mobile device and/or a GPS of the mobile device to record data pertaining to the geographic location of the user, and conditions at that location (e.g., altitude, temperature, humidity level, etc.) as well as details regarding a time spent by the user at the location, an activity performed by the user at the location, etc.

At 708, the application may receive information regarding physical parameters of the user from the wearable device. For example, the application may retrieve information regarding a physical state of the user (nature of physical activity performed, duration of physical activity, user's heart rate, pulse rate, blood pressure, body temperature, etc.). The wearable device may include various sensors for sensing and estimating the various physical parameters of the user, the wearable device communicatively coupled to the mobile device via a communication link. The application may retrieve the required data from the wearable device via the communication link.

At 712, the application may aggregate the data received from one or more wearable devices with the data tracked and collected at the mobile device. At 714, the application may transmit the aggregated information to the in-vehicle computing system of the vehicle over a communication link, such as network 360 of FIG. 3. As previously discussed, the aggregated input may be transmitted to the in-vehicle computing system automatically and continuously, or at fixed intervals. Alternatively, the aggregated input may be transferred in response to a request for data from the in-vehicle computing system.

Figure 8:
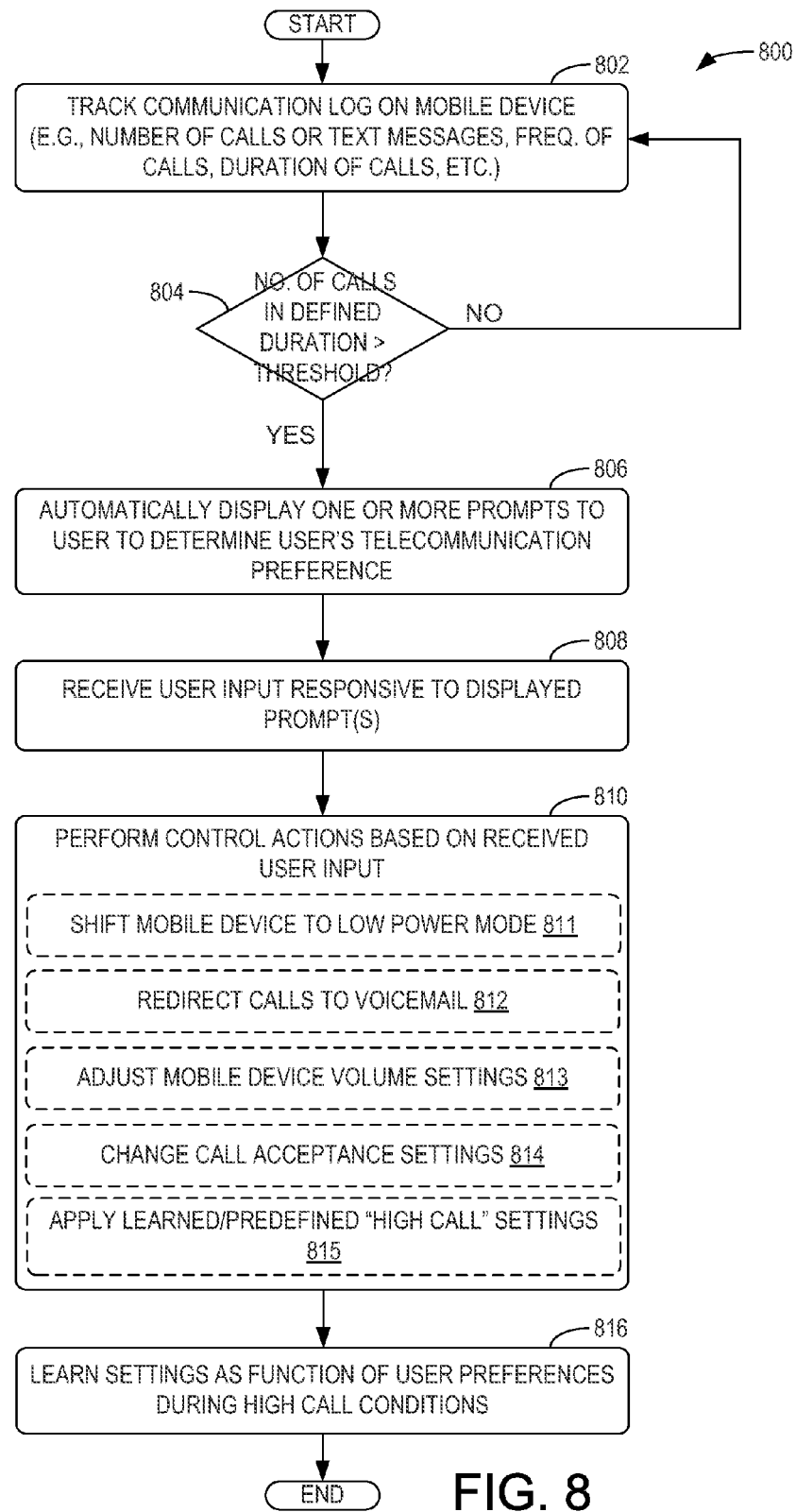
FIG. 8 is a flow chart of a method of receiving user input and performing in-vehicle control actions based on a tracked communication log of a mobile device, in accordance with one or more embodiments of the present disclosure.

Now turning to FIG. 8, an example method 800 is shown for tracking data from a mobile device and prompting a user with setting options based on the tracked data. User input is received following the prompt and used to learn user preferences for selected conditions, such as high call conditions in the present example. Vehicle settings and mobile device settings are then adjusted based on the received user input. The method of FIG. 8 may be carried out by the in-vehicle computing system so as to improve the user's in-vehicle experience.

At 802, the method includes tracking a communication log on a mobile device. The tracking may be performed by the in-vehicle computing system while the user and the mobile device are inside the vehicle, such as while the mobile device is docked. Tracking the communication log may include tracking a number of telephone calls, emails, and/or text messages received on the mobile device, a duration of the calls that are accepted by the user, an identity of caller(s) whose calls are accepted by the user, frequency of calls (such as frequency of overall calls, frequency of calls from a specific caller, etc.), data transferred in each text message or email, etc.

At 804, the method includes determining if the number of calls received in a defined duration has exceeded a threshold. For example, it may be determined if a threshold number of calls have been received at the mobile device in the last 30 mins of vehicle operation. It will be appreciated that while the example is illustrated with reference to a number of calls, the same may be applicable for a number of text messages, emails, or alternate communication method. If the threshold number of calls has not been exceeded in the defined duration, the method continue tracking the communication log of the user's mobile device at 802.

If the threshold number of calls has been exceeded in the defined duration, at 806, the method includes automatically displaying one or more prompts to the user to determine the user's telecommunication preference. For example, the in-vehicle computing system may display one or more prompts on a touch screen of the vehicle. The one or more prompts may be displayed to the user in response to a call being received (e.g., at the onset of the call being received) at the mobile device after the threshold number of calls have been exceeded in the defined duration. Alternatively, the one or more prompts may be displayed to the user in response to a call being received (e.g., at the completion of the call being received) at the mobile device wherein the call causes the threshold number of calls to be exceeded in the defined duration.

In some embodiments, only a single prompt may be displayed. For example, upon receipt of a call following the threshold number of calls being exceeded, a single prompt asking "do you wish to answer this call?" may be displayed. In alternate embodiments, such when the in-vehicle computing system is adaptively learning the user's preferences, multiple prompts may be displayed. These may include, for example, prompts asking the user if they wish to continue receiving calls, if they wish to redirect the call, if they want to selectively accept calls (from only selected callers and not others), if they wish to change mobile device call settings (such as volume settings, vibration settings, power mode settings, etc.), if they wish to mask a mobile device ringer tone with alternate ambient music, etc. As the user preferences are learned over multiple iterations of the method, fewer prompts may be required as settings may be aggregated or grouped and a single prompt may correspond to multiple settings. For example, once user preferences regarding high call conditions are learned, a single prompt asking "do you wish to shift to high call mode?" may be displayed.

At 808, the method includes receiving user input responsive to the displayed one or more prompts. The user may provide input by interacting with the touch screen. The user input may indicate that they wish to not receive any further calls, or only receive calls selectively. At 810, the method includes performing one or more control actions based on the received user input. Example control actions include, shifting the mobile device to a low power mode at 811. This may automatically reduce the call or text or mail acceptance of the mobile device. Control actions may also include automatically redirecting calls to a voicemail system at 812. As another example, at 813, volume settings of the mobile device may be adjusted, for example, decreased, so that the user is not disturbed or distracted by incoming calls and messages while driving. As yet another example, at 814, call acceptance settings may be automatically adjusted so that only calls from selected callers are enabled while calls from other callers are automatically redirected to a voicemail system. The selected callers may be included in a list predefined by the user, identified by the user when prompted (at 806), and/or learned by the in-vehicle computing system over iterations of the method. As another example, the control action may include masking the ringtone of the mobile device with music from a defined audio source, such as a defined radio station or a defined playlist.

In yet another example, one or more of settings 811-814, as well as additional settings not listed above, may be grouped together and defined as a "high call" setting. In response to the user providing input selecting a "high call" mode, at 815, the method may include applying the learned or predefined "high call" mode settings. By applying the settings in response to a user input indicating that they wish to limit their communication load while driving, the stress level of the vehicle driver can be improved, and their in-vehicle experience improved.

In some embodiments, upon prompting at 806, the received user input may indicate that the user wishes to continue answering calls received on the mobile device. In response to such a user input, the in-vehicle control system may automatically redirect calls and other received data (text message, email, etc.) from the mobile device to a user interface and/or external device interface of the vehicle so that the calls can be answered by the user without requiring the user to operate the mobile device in the vehicle while driving. For example, if the mobile device is Bluetooth enabled, the calls may be redirected to a Bluetooth interface of the vehicle such that the call is heard via the audio system of the vehicle, and the data is displayed on a display screen of the vehicle, etc.

At 816, the settings applied may be learned by the in-vehicle computing system as a function of the user's preferences during high call conditions. For example, the settings may be stored in a memory of the computing system as a function of the user's high call preference. The settings may also be grouped and learned as a group of settings to be used during a "high call mode".

One example method for an in-vehicle infotainment system may include receiving aggregated input regarding a physical condition and an environment of a user from a mobile device, input regarding the physical condition of the user collected by a wearable device. The method may further include automatically selecting, at the infotainment system, settings for one or more components of the in-vehicle infotainment system based on the aggregated input, and transmitting control instructions to the one or more components of the in-vehicle infotainment system based on the selected settings. In the example, input regarding the environment of the user may be collected by the mobile device, while input regarding the physical condition of the user may be transmitted from the wearable device to the mobile device. Further, the input regarding the environment of the user and the input regarding the physical condition of the user may be aggregated at the mobile device before transmission to the in-vehicle infotainment system. The infotainment system may receive input regarding the environment of the user from the mobile device by transmitting control instructions to the mobile device to sample an ambient noise level and an ambient music genre, and subsequently receiving input from the mobile device regarding the sampled ambient noise level and ambient music genre.

The infotainment system may automatically select vehicle settings for one or more components of the in-vehicle infotainment system, such as an audio system, a climate control system, and an external device interface, by selecting settings without receiving input from the user. As an example, in response to the aggregated input indicating an elevated physical activity level of the user, the infotainment system may adjust settings of the climate control system to increase cabin cooling. As another example, in response to the ambient noise level being higher than a threshold, the infotainment system may adjust a speaker volume to mask ambient noise while also changing a playlist of the audio system from a last played playlist to a playlist that matches the ambient music genre.

By adapting vehicle settings based on inferred needs of the user, the needs inferred from wearable devices and mobile devices of the user, an in-vehicle ambience is enhanced. Various sensors already available in the wearable device and the mobile device are leveraged to more accurately infer the user's state of body and mind, and adapt vehicle systems to settings that would increase the comfort of the user when in the vehicle. This can substantially improve the user's overall vehicle experience.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system and/or computing device described with reference to FIGS. 1 and 3. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method for an in-vehicle computing system, comprising:
receiving aggregated input regarding a physical condition and an environment of a user from a mobile device, the aggregated input regarding the physical condition of the user collected by a wearable device communicatively coupled to the mobile device;
automatically selecting by a processor of the in-vehicle computing system, one or more vehicle settings based on the received aggregated input before receiving a user input, the vehicle settings selected for the user based on a change in the physical condition and environment of the user;
transmitting control instructions to one or more components of an in-vehicle infotainment system, including a climate control system, based on the automatically selected vehicle settings;
selectively receiving user input from the user via a user interface of the in-vehicle computing system; and
further adjusting, by the processor, the one or more vehicle settings based on the received user input,
wherein the further adjusting the one or more vehicle settings based on the received user input includes overriding, by the processor, the automatically selected vehicle settings based on an input from the wearable device.

2. The method of claim 1, wherein the wearable device is communicatively coupled to the in-vehicle computing system via a network and wherein receiving input from the wearable device includes directly receiving input from the wearable device over the network.

3. The method of claim 1, wherein the wearable device is communicatively coupled to the mobile device, the mobile device communicatively coupled to the in-vehicle computing system via a network, and wherein receiving input from the wearable device includes indirectly receiving input from the wearable device via the mobile device.

4. The method of claim 1, wherein the aggregated input regarding the physical condition of the user collected by the wearable device further includes input indicative of one or more of a physical activity level of the user and a cognitive load of the user.

5. The method of claim 4, wherein the automatically selecting the one or more vehicle settings includes automatically selecting one or more of a cabin climate control system setting and an audio system setting based on the input from the wearable device.

6. The method of claim 5, wherein the aggregated input regarding the environment of the user, the includes one or more of ambient temperature, ambient humidity, ambient noise level, and ambient audio setting.

7. The method of claim 4, further comprising learning the automatically selected vehicle settings as a function of a user state, the user state based on one or more of the physical activity level of the user and the cognitive load of the user.

8. An in-vehicle infotainment system, comprising:
a processor;
an external device interface communicatively coupled to a mobile device; and
a storage device containing instructions, that when executed by the processor, cause the processor to:
receive aggregated input regarding a physical condition and an environment of a user from the mobile device, the aggregated input regarding the physical condition of the user collected by a wearable device communicatively coupled to the mobile device;
automatically select settings for one or more components of the in-vehicle infotainment system, before receiving a user input, based on the aggregated input, the settings selected for the user based on a change in the physical condition and environment of the user;
transmit control instructions to the one or more components of the in-vehicle infotainment system, including a climate control system, based on the automatically selected settings;
selectively receive the user input from the user via a user interface of the in-vehicle infotainment system; and
further adjust the settings for the one or more components based on the received user input,
wherein the further adjusting the settings based on the received user input includes overriding the automatically selected settings based on an input from the wearable device.

9. The system of claim 8, wherein the aggregated input regarding the environment of the user is collected by the mobile device, and wherein the aggregated input regarding the physical condition of the user is transmitted from the wearable device to the mobile device, the aggregated input regarding the environment of the user and the aggregated input regarding the physical condition of the user is aggregated at the mobile device before transmission to the in-vehicle infotainment system.

10. The system of claim 9, wherein the automatically selecting settings for the one or more components based on the aggregated input includes automatically selecting settings without receiving the user input at the in-vehicle infotainment system, the mobile device, or the wearable device, and wherein the one or more components of the in-vehicle infotainment system include an audio system and the climate control system.

11. The system of claim 10, wherein the automatically selecting settings further includes:
in response to the received aggregated input indicating an elevated physical activity level of the user, adjusting settings of the climate control system to increase cabin cooling.

12. The system of claim 11, wherein the automatically selecting settings further includes:
transmitting control instructions to the mobile device to sample an ambient noise level and an ambient music genre; and
receiving input from the mobile device regarding the sampled ambient noise level and ambient music genre.

13. The system of claim 12, wherein the automatically selecting settings further includes:
in response to the ambient noise level being higher than a threshold, adjusting a speaker volume to mask ambient noise; and changing a playlist of the audio system from a last played playlist to a playlist that matches the ambient music genre.

14. An in-vehicle system, comprising:
an audio system;
a climate control system; and
an in-vehicle computing system, including a processor, communicatively coupled to each of the audio system and the climate control system, the in-vehicle computing system configured to:
  receive a first input from a wearable device worn by a vehicle operator, the first input regarding a physical condition of the vehicle operator;
  receive a second input from a mobile device of the vehicle operator, the second input regarding an environment of the vehicle operator;
  automatically select settings of each of the climate control system and the audio system based on the first and second inputs, before receiving a vehicle operator input;
  selectively receive the vehicle operator input from the vehicle operator via a user interface of the in-vehicle computing system; and
  further adjust the settings of each of the climate control system and the audio system based on the received vehicle operator input including overriding the automatically selected settings based on the first input from the wearable device.

15. The system of claim 14, wherein the wearable device includes a wearable sensor and wherein the first input regarding the physical condition of the vehicle operator is indicative of a physical parameter of the vehicle operator, the physical parameter including one or more of a heart rate, a pulse rate, a basal body temperature, a blood pressure, a perspiration level, and an activity level.

16. The system of claim 15, wherein the second input regarding the environment of the vehicle operator is indicative of an environmental parameter of the vehicle operator, the environmental parameter including one or more of an ambient noise level, an ambient music genre, a geographic location of the vehicle operator, an ambient temperature, an ambient humidity, and telecommunication data.

* * * * *